H. J. STEWART.
RESILIENT TIRE.
APPLICATION FILED NOV. 5, 1918.
1,409,795. Patented Mar. 14, 1922.
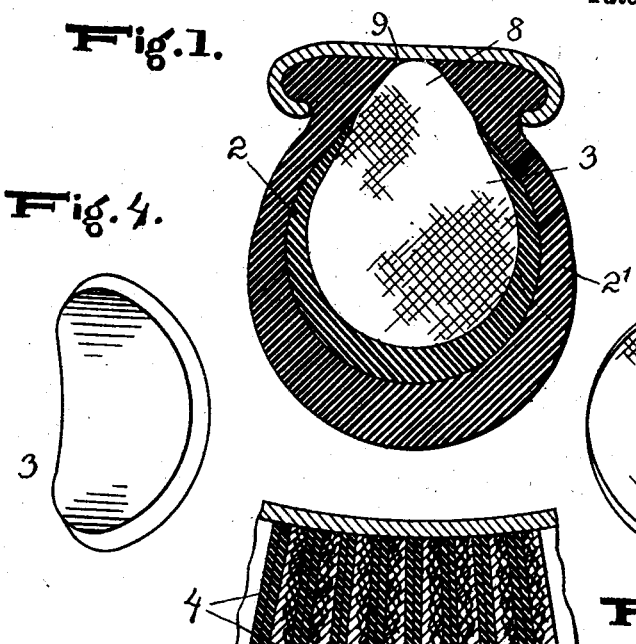
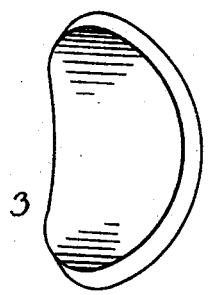
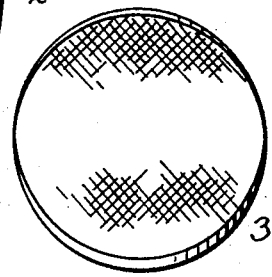
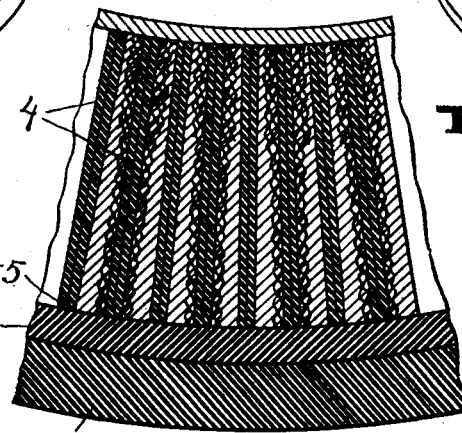
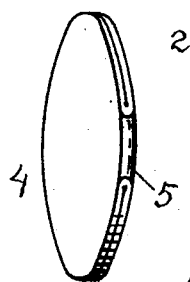
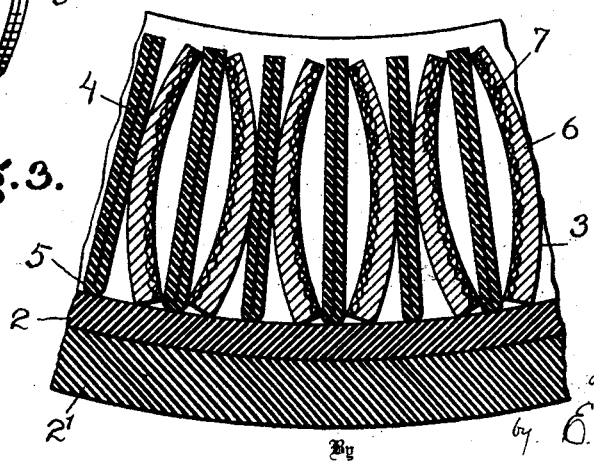
Inventor:
H. J. Stewart,
by E. W. Anderson
Attorneys

UNITED STATES PATENT OFFICE.

HIRAM J. STEWART, OF CANTON, OKLAHOMA.

RESILIENT TIRE.

1,409,795.  Specification of Letters Patent.  Patented Mar. 14, 1922.

Application filed November 5, 1918. Serial No. 261,183.

*To all whom it may concern:*

Be it known that I, HIRAM J. STEWART, a citizen of the United States, resident of Canton, in the county of Blaine and State of Oklahoma, have made a certain new and useful Invention in Resilient Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a transverse section of the tire on the rim.

Figure 2 is a longitudinal fragmentary section of the same.

Figure 3 is a similar view before the disks are pressed together and the rim of the wheel not being shown.

Figure 4 is a detail perspective view of one of the main disks.

Figure 5 is a detail face view of the same.

Figure 6 is a detail edge view of the same.

Figure 7 is a detail edge view of a pair of intermediate disks.

The invention has relation to cushion tires for vehicles, having for its object to provide a substitute for the solid rubber tire, which will have a greater degree of resiliency, be lighter in weight and more economical in manufacture with increased durability, or to provide a tire which will have all of the advantages of a solid rubber tire, and in addition the other advantages stated.

The invention consists in the novel construction and combinations of parts, as hereinafter set forth.

In the accompanying drawings illustrating the invention, the numeral 2 designates the outer casing of a common pneumatic tire, which may be and usually is an old discarded casing, and within the cavity of this casing the following filler is provided:

3, 3, are disks cut or stamped from an old discarded pneumatic tire casing and being normally concavo-convex, as shown, and 4, 4 are disks cut or stamped from an old discarded inner tube of a pneumatic tire, said disks so stamped usually with a neck 5, connecting each two disks.

The disks 3 are composed of an outer layer 6 of rubber tread composition, being of wear resisting nature, and of a plurality of layers 7 of canvas or fabric, backing up the layer 6 and incorporated therewith as usual, the canvas backing layers being rubber impregnated.

The disks 4 made from the inner tube are composed of soft rubber.

In placing the filling layers within the casing, the latter is spread at the inner or slotted portion thereof and a group consisting of two layers 3, two layers 4 located between the layers 3, and two layers 4 located at one side of one of the layers 3, is assembled and being grasped with the fingers of one hand is inserted within the casing through the slot thereof. Groups of layers made up as stated are then inserted within the cavity of the casing, one group after another until the cavity is filled and no more groups or layers can be inserted by any ordinary means, or by the hand alone.

A suitable spreading tool is then inserted between the filling layers at some convenient point, and these layers pressed apart at this point to compress all of the layers or bring them closer together so that they will not take up so much room, other groups of layers or single layers being then inserted in the space so provided until no more layers can be inserted within the casing.

In the lateral pressure upon the layers to bring them closer together so that they will take up less room and whereby the casing is enabled to be more compactly filled, the concavo-convex layers 3 will have their concavo-convexities removed and will be made to assume a flat form as shown in Figure 2.

It has been found by experiment that if the concavo-convex layers are placed together with the concave face of one layer facing the convex face of another layer, and the double layers 4 being therebetween as stated, in use the layers 3 will bend or collapse radially of the wheel or under strain of the load thereupon, and it has been further found that if the layers 3 are normally flat, that this objectionable result or collapsing will still take place, the result being the filling layers will become loose in the casing, which will thereby become rim cut, and the usefulness of the tire destroyed.

To avoid this objection applicant has found through experiment that it is necessary to brace the layers against such collapsing, and has taken advantage of the concavo-convexity of the layers 3 to obtain automatically a bracing effect of one layer upon the other by placing the layers 3 with the concave face of one layer facing the concave face of another layer, the layers 4 being of course therebetween as stated, whereby any bending or collapsing of the one layer 3 radially of the wheel and transversely of the layer towards the normal concavo-convex form of this layer, will necessitate a bending transversely or collapsing of the aforesaid other layer 3 in a direction away from normal concavo-convex form, said other layer 3 resisting any such bending or collapsing and effectually bracing the first named layer 3 against any such bending or collapsing. In this way, all of the layers of which the layers 3 form the principal portion, will stand up against the tread of the tire and always properly support the same.

Inasmuch as the layers 3 cut from the tire casings are circumferentially rather uneven and also rough, the casing 2 would ordinarily become cut or worn by such irregularity and roughness, and to avoid this and increase the life of the tire, two outer discarded casings of such size that one will fit accurately within the other are selected, and being so placed or fitted, the inner flanges of the inner casing being first cut away or removed, the filling layers are inserted in position as stated. The outer of these casings is designated 2'.

The pressure exerted in making up this tire is made sufficient to compress the layers 3 and 4 so that they will be provided with inner extensions 8, solidly filling in the annular interval 9 between the inner flanges of the tire casing, thereby backing up the tire and rendering it impossible for the layers 3 and 4 to fall away from the tread thereof, and also holding the flanges of the casing securely in their seats in the channels of the rim.

It is found in practice that the resiliency of the tire will be considerably greater than that of a solid rubber tire of the usual wear-resisting composition; that the tire will be lighter in weight and have a longer life than such a solid tire, and be capable of more economical manufacture, there being less rubber employed and worn parts of tires otherwise comparatively useless being utilized.

I claim:—

1. A resilient vehicle tire, composed of an outer tubular casing, and an inner core including groups of radially arranged normally concavo-convex disks placed in pairs with their concave faces facing each other and compressed to flat form to automatically brace each other against collapse.

2. A resilient vehicle tire, composed of an outer tubular casing, and an inner core including groups of radially arranged normally concavo-convex disks placed in pairs with their concave faces opposite each other and compressed to flat form to automatically brace each other against collapse, said disks being of wear-resisting rubber composition and rubber impregnated fabric, and intermediate disks of soft rubber located between the first named disks.

In testimony whereof I affix my signature in presence of two witnesses.

H. J. STEWART.

Witnesses:
 Wm. R. Baum,
 G. M. Anderson.